United States Patent
Le Chevalier

(10) Patent No.: US 11,861,776 B2
(45) Date of Patent: Jan. 2, 2024

(54) SYSTEM AND METHOD FOR PROVISION OF PERSONALIZED MULTIMEDIA AVATARS THAT PROVIDE STUDYING COMPANIONSHIP

(71) Applicant: Chegg, Inc., Santa Clara, CA (US)

(72) Inventor: Vincent Le Chevalier, Waikoloa, HI (US)

(73) Assignee: Chegg, Inc., Santa Clara, CA (US)

( * ) Notice: Subject to any disclaimer, the term of this patent is extended or adjusted under 35 U.S.C. 154(b) by 0 days.

(21) Appl. No.: 17/531,353

(22) Filed: Nov. 19, 2021

(65) Prior Publication Data
US 2023/0162420 A1   May 25, 2023

(51) Int. Cl.
*G06T 13/40* (2011.01)
*G06T 13/80* (2011.01)
(Continued)

(52) U.S. Cl.
CPC .............. *G06T 13/40* (2013.01); *G06F 3/011* (2013.01); *G06T 13/80* (2013.01); *H04L 65/60* (2013.01); *H04L 67/1095* (2013.01)

(58) Field of Classification Search
CPC ......... G06T 13/40; G06T 13/80; G06F 3/011; H04L 65/60; H04L 67/1095
See application file for complete search history.

(56) References Cited

U.S. PATENT DOCUMENTS 6,725,399 B1   4/2004   Bowman
7,418,656 B1   8/2008   Petersen
(Continued)

FOREIGN PATENT DOCUMENTS

EP   2344038 A2   7/2011
WO   2010047832 A2   4/2010

OTHER PUBLICATIONS

Tom Warren "Microsoft Teams enters the metaverse race with 3D avatars and immersive meetings—The Verge", <URL: https://www.theverge.com/2021/11/2/22758974/microsoft-teams-metaverse-mesh-3d-avatars-meetings-features>, Nov. 2, 2021.
(Continued)

*Primary Examiner* — Yu Chen
(74) *Attorney, Agent, or Firm* — Sheppard Mullin Richter & Hampton LLP

(57) ABSTRACT

Methods, systems, and apparatus, including computer programs encoded on computer storage media, for providing personalized avatars for virtual companionship are disclosed. One of the methods includes capturing one or more current online activities of a user of an online education platform providing learning services to the user; receiving sensor data from one or more electronic devices of the user; detecting an event by analyzing a combination of the one or more captured online activities of the user and the received sensor data; determining one or more avatars and one or more special effects associated with the one or more avatars based on the detected event and one or more pre-determined rules mapping avatars and special effects to events; generating multimedia content comprising the one or more avatars and the one or more special effects; and streaming the generated multimedia content to a multimedia display device of the user.

20 Claims, 9 Drawing Sheets

(51) Int. Cl.
*H04L 67/1095* (2022.01)
*H04L 65/60* (2022.01)
*G06F 3/01* (2006.01)

(56) References Cited

U.S. PATENT DOCUMENTS

| | | | |
|---|---|---|---|
| 9,197,660 B2 | 11/2015 | Sun et al. | |
| 9,282,100 B2 | 3/2016 | Clark et al. | |
| 9,940,606 B2 * | 4/2018 | Madhavan | G06Q 10/1053 |
| 11,058,942 B2 * | 7/2021 | Kiani | A61B 5/0205 |
| 11,442,685 B2 * | 9/2022 | Anderson | G06F 3/147 |
| 11,504,856 B2 * | 11/2022 | Shukla | B25J 11/0015 |
| 2003/0146977 A1 | 8/2003 | Vale et al. | |
| 2004/0216032 A1 | 10/2004 | Amitay et al. | |
| 2005/0208461 A1 | 9/2005 | Krebs et al. | |
| 2006/0041538 A1 | 2/2006 | King et al. | |
| 2006/0048096 A1 | 3/2006 | Jiang et al. | |
| 2006/0277080 A1 | 12/2006 | DeMartine et al. | |
| 2007/0099161 A1 * | 5/2007 | Krebs | G09B 7/00 434/362 |
| 2009/0031402 A1 | 1/2009 | Jung et al. | |
| 2009/0089654 A1 | 4/2009 | Wittig et al. | |
| 2009/0298039 A1 * | 12/2009 | Glazier | G09B 7/00 434/362 |
| 2009/0306959 A1 | 12/2009 | Rappoport et al. | |
| 2010/0082677 A1 | 4/2010 | Athsani et al. | |
| 2010/0083139 A1 * | 4/2010 | Dawson | A63F 13/12 715/757 |
| 2011/0223576 A1 | 9/2011 | Foster et al. | |
| 2012/0064971 A1 * | 3/2012 | Devine | A63F 13/216 463/31 |
| 2012/0077157 A1 * | 3/2012 | Clarke | G09B 7/02 434/188 |
| 2014/0125678 A1 * | 5/2014 | Wang | A63F 13/80 345/473 |
| 2015/0120593 A1 * | 4/2015 | Madhavan | G06Q 10/1053 705/321 |
| 2015/0246285 A1 * | 9/2015 | Branson | A63F 13/56 463/31 |
| 2016/0117301 A1 | 4/2016 | Chan | |
| 2017/0019421 A1 | 1/2017 | Hebert et al. | |
| 2017/0060829 A1 | 3/2017 | Bhatt | |
| 2017/0206095 A1 * | 7/2017 | Gibbs | G06N 3/006 |
| 2017/0358117 A1 * | 12/2017 | Goossens | H04L 51/10 |
| 2018/0018349 A1 | 1/2018 | Liu et al. | |
| 2019/0340802 A1 * | 11/2019 | Tarawneh | G06T 13/00 |
| 2020/0111262 A1 * | 4/2020 | Rabinovich | G06F 3/0346 |
| 2020/0151961 A1 * | 5/2020 | Viner | G06T 19/006 |
| 2021/0004680 A1 * | 1/2021 | Publicover | G06V 20/30 |
| 2021/0287416 A1 * | 9/2021 | O'Hagan | G06T 13/40 |
| 2022/0001238 A1 * | 1/2022 | Kwatra | G06F 3/011 |
| 2022/0197403 A1 * | 6/2022 | Hughes | G06F 3/03543 |
| 2022/0208016 A1 * | 6/2022 | Le Chevalier | H04L 12/1827 |
| 2022/0217317 A1 * | 7/2022 | Xu | H04N 13/167 |

OTHER PUBLICATIONS

Jaligama et al., "An Online Virtual Learning Environment for Higher Education," 2011 Third International Conference on Games and Virtual Worlds for Serious Applications, copyright 2011 IEEE, p. 207-214. (Year: 2011).

Qian et al., "Automated Testing and Smart Tutoring System for Web Application," 2008 International Workshop on Education Technology and Training & 2008 International Workshop on Geoscience and Remote Sensing, copyright 2008 IEEE, p. 582-585. (Year: 2008).

* cited by examiner

SYSTEM AND METHOD FOR PROVISION OF PERSONALIZED MULTIMEDIA AVATARS THAT PROVIDE STUDYING COMPANIONSHIP

TECHNICAL FIELD

This application generally relates to creation and delivery of personalized multimedia avatars for providing virtual studying companionship.

BACKGROUND

Current video and audio services provide multimedia clips that can be consumed by a student in the background while studying. The multimedia content provided by these services are often created and uploaded to a website in advance. Explicit user instructions (e.g., mouse click on user interface elements) are generally required to initiate playback of a multimedia clip and to switch to a different multimedia clip. The video and audio services do not require awareness of a user's real-time activities in providing content to the user.

Various computer applications in gaming and related fields display avatars that represent a current user, other users, or virtual characters. Avatars may be rendered as still images or animations. Characteristics of avatars may be linked with a user's status or activities.

However, there are disadvantages related to consuming multimedia content from current video and audio services during studying. Because the multimedia content items are often created for entertainment and designed to occupy a maximum amount of a user's attention, they may often act as a distraction when consumed by the user during studying activities. There are also limited ways to automate synchronization or update of such multimedia content with respect to the current learning activity of the user. A user's interface with a manual control for selecting content for consumption may further distract from the user's studying activities. Furthermore, while avatars have been used for various applications, there is no solution providing avatars personalized for particular users and designed for studying activities. The increasing prevalence of online or remote education makes it more common for students to study alone in unconventional environments (e.g., at home alone) that can make the student's experience a lonely one. There is a strong need for solutions that provide multimedia content as companion to a student studying alone to provide the appearance of learning in a group instead of being solitary. Such a solution would bring about the benefit of improving productivity and mental health of students.

SUMMARY

Various embodiments of the specification include, but are not limited to, systems, methods, and non-transitory computer readable media for providing personalized avatars for virtual companionship.

In some embodiments, a method for providing personalized avatars for virtual companionship comprises capturing one or more current online activities of a user of an online education platform providing learning services to the user; receiving sensor data from one or more electronic devices of the user; detecting an event by analyzing a combination of the one or more captured online activities of the user and the received sensor data; determining one or more avatars and one or more special effects associated with the one or more avatars based on the detected event and one or more predetermined rules mapping avatars and special effects to events; generating multimedia content comprising the one or more avatars and the one or more special effects; and streaming the generated multimedia content to a multimedia display device of the user, wherein the streamed multimedia content is synchronized with the one or more online activities of the user.

In some embodiments, the learning services may comprise educational content services comprising electronic textbooks, flash cards, or tutorial videos; online question-and-answer services; or online testing services.

In some embodiments, the event may comprise a change in environmental conditions, the change in environmental conditions comprising: a change in an ambient temperature; a change in a humidity level; or a change in an ambient noise level.

In some embodiments, the event may comprise a movement of the user, the movement of the user comprising: standing up; sitting; walking; yawning; or stretching.

In some embodiments, the event may comprise a change in a physiology condition of the user, the change in the physiology condition of the user comprising: a change of heart rate; a change of body temperature; a change of oxygen level; a change of blood pressure; or dehydration.

In some embodiments, the determining one or more avatars may comprise selecting, based on the detected event, one or more roles from a plurality of available roles of avatars, wherein each of the determined one or more avatars is of a role among the one or more selected roles. In some embodiments, the available roles of avatars comprise one or more of: a student; a tutor; or a librarian.

In some embodiments, the determining one or more avatars may comprises: determining, based on the detected event, a quantity of avatars to present, wherein the determined one or more avatars consist of one or more avatars of the determined quantity.

In some embodiments, the determining one or more avatars and one or more special effects may comprise: selecting the one or more avatars from a library comprising a plurality of avatars; and selecting the one or more special effects from a library comprising a plurality of pre-rendered special effects each corresponding to at least one of the plurality of avatars.

In some embodiments, the multimedia content may comprise: video; a combination of video and audio; or a combination of video and text overlay content.

In some embodiments, the generating the multimedia content may comprise: detecting an activity of the user based on the one or more captured online activities and the received sensor data; customizing the one or more special effects based on the detected activity; and generating the multimedia content based on the one or more customized special effects.

In some embodiments, the customizing the one or more special effects based on the detected activity may comprise: selecting one or more actions by at least one of the one or more avatars based on the detected activity of the user, wherein the one or more actions are the same as or similar to the detected activity; determining one or more points in time associated with the one or more selected actions; and generating one or more special effects representing the at least one of the one or more avatars performing the selected one or more actions at the one or more points in time, respectively.

In some embodiments, the customizing the one or more special effects based on the detected activity may comprise:

determining a duration of the detected activity; and triggering a special effect when the duration of the detected activity reaches a threshold.

In some embodiments, the generating the multimedia content may comprise: determining a virtual background based on the detected event; and projecting the one or more avatars on the virtual background.

In some embodiments, the generating the multimedia content may comprise: identifying content accessed by the user on the online education platform; customizing the one or more special effects based on the content accessed by the user; and generating the multimedia content based on the one or more customized special effects.

In some embodiments, the customizing the one or more special effects based on the content accessed by the user comprises: selecting content to be interacted with by at least one of the one or more avatars based on the content accessed by the user; and generating a special effect representing the at least one of the one or more avatars interacting with the selected content, wherein selected content comprises the content accessed by the user, content related to the content accessed by the user, or random content.

In some embodiments, the method may further comprise determining that the detected event has ended; and streaming default multimedia content to the multimedia display device of the user.

In some embodiments, the method may further comprise, prior to capturing one or more online activities of a user on an online education platform, for one of the plurality of avatars: rendering a two-dimensional or three-dimensional representation of the avatar; pre-rendering one or more special effects associated with the avatar by animating the representation of the avatar to follow one or more actions; and storing the one or more special effects in the library comprising the plurality of pre-computed special effects.

In some embodiments, a non-transitory computer-readable storage medium for providing personalized avatars for virtual companionship may be configured with instructions executable by one or more processors to cause the one or more processors to perform a plurality of operations. The operations may comprise capturing one or more current online activities of a user on an online education platform providing learning services to the user; receiving sensor data from one or more electronic devices of the user; detecting an event by analyzing a combination of the one or more captured online activities of the user and the received sensor data; determining one or more avatars and one or more special effects associated with the one or more avatars based on the detected event and one or more pre-determined rules mapping avatars and special effects to events; generating multimedia content comprising the one or more avatars and the one or more special effects; and streaming the generated multimedia content to a multimedia display device of the user, wherein the streamed multimedia content is synchronized with the one or more online activities of the user.

In some embodiments, a system for providing personalized avatars for virtual companionship may comprise a processor and a non-transitory computer-readable storage medium storing instructions executable by the processor. The instructions may be executed to cause the system to: capture one or more current online activities of a user on an online education platform providing learning services to the user; receive sensor data from one or more electronic devices of the user; detect an event by analyzing a combination of the one or more captured online activities of the user and the received sensor data; determine one or more avatars and one or more special effects associated with the one or more avatars based on the detected event and one or more pre-determined rules mapping avatars and special effects to events; generate multimedia content comprising the one or more avatars and the one or more special effects; and stream the generated multimedia content to a multimedia display device of the user, wherein the streamed multimedia content is synchronized with the one or more online activities of the user.

Embodiments described herein are related to creating one or more virtual avatars as companion to a user who is studying. The one or more avatars may be customized based on the user's preferences and may be further customized based on the user's online learning activities as well as the user's environmental status, physiology conditions, and the user's physical activities. The avatars may be provided as a multimedia stream that may include video or audio to a display device of the user. The avatars, special effects that control the animation of the avatars, and a virtual background for the multimedia stream may be dynamically adjusted based on the activities of the user. The dynamically adjusted avatars may facility the provision of the proper types of support and companion as the user needs them.

Embodiments described herein provide overcomes technical problems and disadvantages with existing solutions that are discussed in the Background section. First, embodiments disclosed herein enables various ways to customize the avatars to fit a user's needs. The avatars, their actions or special effects, and background environment may be customized based on a user's online learning activity as well as based on a combination of the online learning activity and the user's real-world activities. The avatars are customizable in multiple aspect such as the number of avatars (e.g., multiple avatars as well just one avatar), different education related roles (e.g., students, tutors, librarians), and different backgrounds (e.g., classroom, library). The multimedia stream carrying the avatars may be in various different forms such as various combinations of video and audio. The flexibility in customizing and adapting the avatars to a user's activities and preferences improves the effectiveness of the avatars in serving as a studying companion and aid. Second, in some embodiments, the avatars can be changed based on detected events in a user's studying session. In addition to changing the avatars, the actions of the avatars may also be synchronized with the user's activities such that they appear responsive to the user's activities. The provision of the avatars and special effects also take into consideration the duration of a user's activities. The real-time or pseudo real-time synchronization of avatar rendering with user's activities allows the avatar provision to timely track and cater to the user's real-world situations and to better simulate real-world studying companions. Third, in some embodiments, the avatars, special effects, and backgrounds are selected from library's of pre-rendered content using a rule-based process. Because the content are pre-generated but combined in real time, the system provides improved efficiency than systems that generate multimedia content when the content is to be streamed and provides more flexibility than systems that uses fixed arrangements of content.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

DETAILED DESCRIPTION

Embodiments disclosed herein provide a method and system for providing personalized multimedia avatars that provide virtual "student companionship," "tutoring," and "librarian" modelization to a user that is studying alone. A virtual avatar production system generates the multimedia avatars and may stream one or more of the multimedia avatars to one or more display devices for rendering to the user. The avatar production system may also be coupled to an online education platform that provides one or more education services to the user. The user may use the one or more display devices or different user devices to conduct one or more studying activities on the online education platform, depending on the user's goals and mood. E.g., if the user wants to study with companionship but without distraction, the user may use a first device (such, as a laptop) to conduct studying activities while the avatar is presented on a second device (such as, a connected television screen in the room in which the user is studying). On the other hand, if the user wants to study with a lot of interaction, the avatar may be presented on the same device (e.g., user's laptop) that the user is using for studying.

In some embodiments, the avatar production system may obtain from the online education platform real-time information about the user's studying activities, create one or more of the avatars based on such information, and synchronize special effects of the avatars with such studying activities. The avatar production system may further receive environmental, physiology, or motion information associated with the user and create and synchronize the avatars further based on such information to direct support to the user. The environmental, physiology, or motion information may be captured by sensors of smart phones, wearable devices, or connected speakers of the user, such as microphones, cameras, motion trackers, physiology sensors, or environmental sensors.

Figure 1:
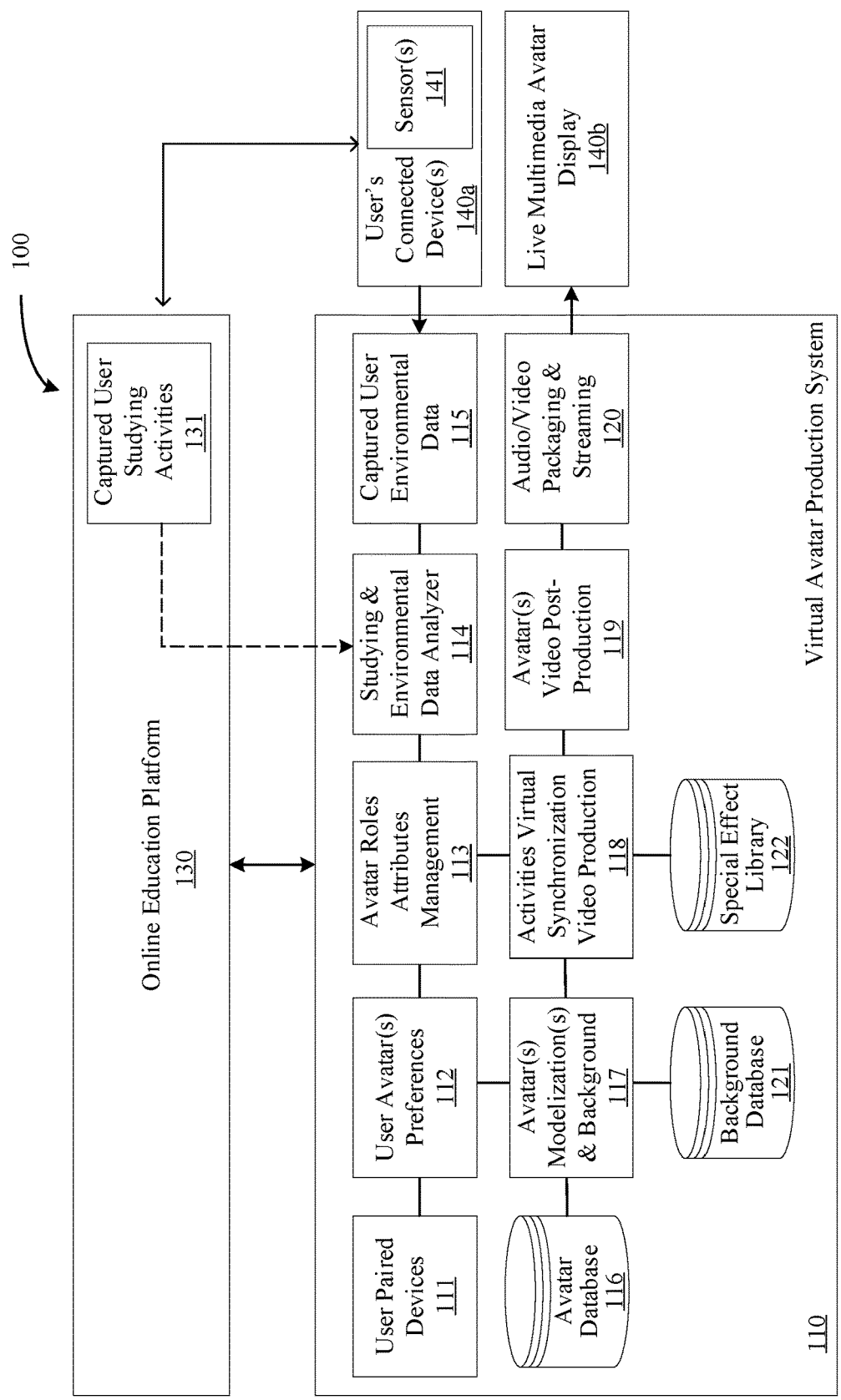
FIG. 1 illustrates an example system architecture for providing personalized multimedia avatars for virtual studying companionship.

FIG. 1 illustrates an example system architecture 100 for providing personalized multimedia avatars for virtual studying companionship. In some embodiments, the system architecture 100 may comprise an avatar production system 110, an online education platform 130, one or more user devices 140*a*, and one or more display devices 140*b*. The one or more display devices 140*b* may receive a streaming of one or more multimedia avatars from the avatar production system 110 and display the avatars to the user. The one or more display devices 140*b* may comprise a monitor, a speaker, a computer, a projector, a hologram projector, a smart phone, a smart tablet, a pair of virtual reality or augmented reality glasses, a wearable device, other suitable devices, or any combination thereof.

In some embodiments, the user is a user, such as a registered user, of the online education platform 130. In some embodiments, as described further in the instant specification, the user is a human user in the analog universe, who is performing study activities, e.g., reading, writing, taking an examination. In other embodiments, the user is a human user in the metaverse and is wearing a VR headset. That headset includes display, computing platform, motion sensors, front cameras, built-in speakers, microphone, other sensors (eye tracking for example), network, etc., like a smartphone but much more immersive. The rendering and modelization of the 3D avatars would be the same for both the user in the analog world and the user in the metaverse, except that streaming of the avatars would be rendered only within the VR/metaverse display and not on separate display devices. In the metaverse, the user (engaged in study activities) is itself an avatar, among other computed avatars rendered in virtual computed backgrounds, with the other computed avatars reacting to the user's activities.

The one or more user devices 140*a* may comprise one or more devices paired to the avatar production system 110 and one or more devices paired with the online education platform 130. One or more of the user devices 140*a* may each comprise one or more sensors 141 for collecting environmental, physiology, or motion data associated with the user and provide such data to the avatar production system 110. One or more of the user devices 140*a* may be paired with the online education platform 130 through a network to allow the user to access educational content on the online education platform 130. The one or more user devices 140*a* may comprise a mobile phone, a speaker, a microphone, a camera, a wearable device, a motion tracking device, a hygrometer, a thermometer, other suitable devices, or any combination thereof. The one or more user devices 140*a* paired with the online education platform 130 may or may not be the same as the one or more display devices 140*b*. The same device may be used to display avatars streamed from the avatar production system 110 to the user as well as to display educational content from the online education platform 130 for the user to interact with. Alternatively, different devices may be used for these different purposes. In other words, the one or more display devices 140*b* and the one or more user devices 140*a* shown in FIG. 1 may be implemented as one device or multiple different devices.

The online education platform 130 may be implemented on one or more server-side computing devices. The online education platform 130 may be coupled to the avatar production system 110 and one or more user devices 140*a* via one or more network connections. The online education platform 130 provides learning services to its registered users. The learning services may include passive learning services that provide content to be read, watched, or listened to by a learner, such as e-textbooks, flash cards, tutorial videos. The learning services may also include active learning services that provide content that is made for interaction with the learner, such as question & answers, quizzes, and interactive tutorials. The learning services may further include recall-type learning services that provide content used for testing the knowledge of the learner, such as tests.

The avatar production system 110 is architected around the modelization, production and post-production of one, or more, personalized avatars, which are streamed to a registered user's paired multimedia capable device, when that user is studying using the online education platform services. The avatar production system 110 comprises various sub-systems implemented by software, hardware, or a combination thereof. Each sub-system may be implemented on one or more memories or other storage devices configured to store data and computer-executable instructions and one or more processors configured to execute the instructions to perform one or more operations of the sub-system. Different sub-systems may be combined into one sub-system. Each sub-system may be separated into multiple individual sub-systems.

The avatar production system 110 may comprise a device management system 111 for managing paired devices 140. The device management system 111 may store information associated with a plurality of paired devices 140 such as identification and network addresses for the paired devices 140. A user may select two types of devices to be paired with the avatar production system 110.

First, the paired devices may comprise multimedia devices 140b. Multimedia devices are connected devices with multimedia playback support, such as mobile phone, laptop, or connected TV. These devices are configured to receive and display the multimedia stream of the virtual avatars constructed by the avatar production system 110. The avatar production system 110 may store information associated with one or more multimedia devices of a user and stream the avatars to one of the one or more multimedia devices based on user preferences or instructions. The one or more display devices 140b used by the user to view avatars constructed by the virtual avatar production system may be implemented as one or more of the multimedia devices.

Second, the paired devices may comprise environmental, physiology, and motion devices such as smart phones, wearables or connected speakers. These devices can be paired by the avatar production system to detect environmental, physiology, and motion conditions which may impact the quality of a studying session. The devices may have sensors 141 including, for example, cameras, microphones, motion-tracking sensors, or ambient temperature sensors. The sensors 141 may, for example, capture certain type of body movements from the user, such as standing-up, sitting, walking and stretching, as well as sudden noise level, heart rate, ambient temperature and humidity, among others. The one or more user devices 140a may be implemented as one or more of the environmental, physiology, and motion devices.

The avatar production system 110 may comprise a preference management system 112 for managing user avatar preferences. The preferences may be set by the user by selecting one or more properties in a user interface provided by the avatar production system 110 for display on at least one of the display devices 140b. The preference management system 112 may store a plurality of preferences by each user. The avatar production system 110 may create avatars for each user based on the preferences of the user. These preferences may include preferences for: role, number, duration, style, virtual background, content synchronicity, activities synchronicity, environmental, physiology & motion devices, and so on.

Under the preferences for "role", the avatar production system 110 may allow a user to select among a plurality of avatar roles, such as, "Student", "Tutor", and "Librarian". While the disclosure describes these three roles, other roles can be added as well.

Under the preferences for "number", the avatar production system 110 may allow a user to select a number of avatars to be displayed by the avatar production system 110. For example, the user may select from a number from one avatar up to a classroom full of avatars, represented together in same stream. In some embodiments, the avatar production system 110 may have one or more restrictions on the number of certain types of avatars. For example, the restrictions may specify that there can only be one "Tutor" or one "Librarian" in a single studying session stream. On the other hand, multiple "Students" may be allowed for a single studying session stream.

Under the preferences for "duration", the avatar production system 110 may allow a user to set the length of a study session during which one or more avatars will be streamed. This preference may allow the avatar production system to set a time-constrained session by modeling time-based avatar actions.

Under the preferences for "style", the avatar production system 110 may allow a user to select from a library of real or fictitious persons or characters, or as uploaded by a user. Each avatar can be further personalized using school/university differentiators, such as logos, mascot, colors, or others.

Under the preferences for "virtual background", the avatar production system 110 may allow a user to select from a library of real or fictitious recorded backgrounds or as uploaded by a user. Each background can be further personalized using school/university differentiators, such as logos, mascot, colors, or others.

Under the preferences for "content synchronicity", the avatar production system 110 may allow a user to select the type of content to be used by an avatar. Given that the user is interacting with online education platform 130, the online education platform 130 may share the type of content accessed by that user at a given time with the avatar production system 110. This category of preferences instruct the avatar production system 110 to model the content used by virtual avatars based on the content accessed by the user. Options under this category of preferences may include "Random" (any learning content), "Mirror" (same content a the content current accessed by the user), "Related" (similar type of content to that accessed by the user). For example, a user studying the textbook "Biology 101, Chapter 2, Page 22" may instruct the avatar production system 110 to either select random content (e.g., any book), mirror that textbook (e.g., Biology 101), or use a related one (e.g., another biology book) for the avatar modelization.

Under the preferences for "activities synchronicity", the avatar production system 110 may allow a user to select the style of synchronization activities between the avatar created by the avatar production system 110 and the user. Options under this category of preferences may include "Random" (that is, randomly synchronize any user activity with the avatar), "Slow Mirroring" (that is, the avatar mimics the user's activity at a slower pace), "Fast Mirroring" (that is, the avatar mimics the user's activity at a faster pace), "Asynchronous" (e.g., the avatar mimics the user's activity in an asynchronous manner), "None" (that is, do not synchronize activities between the user and avatar).

Under the preferences for "environmental, physiology & motion devices", the avatar production system 110 may allow a user to select the type of environmental, physiology and/or motion devices 140*a* and associated sensors 141 to capture data associated with the user during studying sessions.

The avatar production system 110 may comprise an avatar role and attributes management system 113 for managing the roles of available avatars and the actions associated with each of the roles. An avatar is modeled in function of its learning-based roles, such as "Student", "Tutor" or "Librarian". Each role defines a range of pre-determined actions by an avatar of the role. The modeled actions may correlate to activities captured from a user's studying session. Each action is part of a library of pre-defined actions, determined by role, which is modeled and visualized by the avatar production systems. Actions are modeled either by events mirroring the studying activities or modeled from events experienced by the user and its environment. The type of actions done by an avatar depends on its designated role.

In some embodiments, in the "Student" role, an avatar mimics a student who is studying. The avatar does so by rendering recorded learning actions that mimic the student's expected actions while the student is focused on learning activities. Actions of the role may be determined based on content and synchronicity activities preferences. The actions may comprise, for example, opening/closing a book, turning pages, writing notes, stretching neck or shoulders, flexing hands or fingers, looking around, and so on. Actions in this role may be considered non-disturbing to the other students, and include actions that will not impact the focus of others specifically. This role may be defined as supportive and unobtrusive. In some embodiments, there may be another role called the "Twin" or "Mirror Image" role, which is a special case of the "Student" role, and in which the avatar not only mimics the student's expected actions, but also mimics the student's appearance.

In some embodiments, in the "Tutor" role, an avatar mimics a tutor who tutors a student. The avatar does so by rendering a set of recorded supporting learning actions that mimic the expected actions of a tutor who is helping a student to learn. In this role, the avatar actions may be created to provide positive or negative feedback and other forms of encouragement to the student during a study session, including by reacting to learning activities of the student that have been captured by the online education platform 130. The captured learning activities may be reflective of the progress, or lack of, a student makes during the study session and these activities can be translated into a set of recorded actions that can be modeled by the avatar production system 110. Examples of captured learning activities include: a reading pace (e.g., a pace of reading pages of a particular section of a textbook), presence or absence of the writing of personal notes, number of correct or incorrect answers provided to a quiz or test, time remaining in learning session, and so on. As the student performs one or more of these learning activities, the tutor avatar may perform such actions as a "thumps-up", a "thumbs-down", or encourage the student by an audio of "Keep going for another 15 minutes", and so on.

In some embodiments, in the "Librarian" role, the avatar mimics a librarian who is helping a student. The avatar does so by rendering a set of recorded actions that a librarian may be expected to perform to help a student to focus while studying. In this mode, the librarian is reacting to events captured by the paired environmental, physiology and motion sensors, corresponding to situations which would potentially disturb the learner or other students, such as sudden loud background noises, loud voices, high ambient temperature, heart rate, or fast motion movements, for examples. The predefined actions a librarian may take as a response to these events would include "asking for calm", "walking towards the student", "staring at the student through the display", "open a window because it is too hot here", "drink a glass of water", "take a deep breath" or "asking the student to stop creating a disturbance". Such actions can be modelized through the production of video only avatars, combination of video and audio, or a combination of a video and text overlay content. The audio effects may be created to be non-disturbing, including, for example, the sound of flipping pages of a book, the sound of a pen writing on a piece of paper, the sound of a person's steps, the sound of a person drinking water, the sound of a person taking a deep breath, other suitable audio effects, or any combination thereof.

The avatar production system 110 may comprise an avatar modelization and background system 117 for modeling avatars and their corresponding backgrounds. The modelization may be based on creating two-dimensional (2D) or three-dimensional (3D) graphical likeness of real or fictitious characters that can be mapped dynamically into the selected virtual backgrounds by the production and post-production systems. The avatar modelization and background system 117 may retrieve 2D or 3D graphical models of avatars from an avatar database 116. The 2D or 3D graphical models may be pre-rendered by the avatar production system 110 or received by the avatar production system 110 from another source and stored in avatar database 116. The avatar database 116 may comprise information associated with the look and feel of avatars, such as height, race, gender, fitness, clothes, etc. The avatar database 116 may further comprise additional information regarding, for example, the way avatars move and the sound of avatars' voices. In addition, the avatar database 116 may include a set of learning objects associated with the learning activities of a user, such as the front cover of the textbook(s) being read by the user, a pen for taking notes, a notebook, a school uniform, a logo, etc. The learning objects may be rendered along with the avatar modelization, as objects used by the avatars. Backgrounds are digitized into still frames or video clips, based on an existing background library, or as uploaded from the user to the avatar production system 110. The background library may be stored in a background database 121. The background library may comprise a collection of background images to be used as background with the avatars on the foreground. The background library may comprise pre-defined background images. It may also comprise background images customized from background pictures uploaded by one or more users. One or more background images in the background library may be customized or personalized based on one or more objects, such as a desk, a wall decoration item, plants, etc. The 2D or 3D graphical representation of the avatars may range from simple emoji (2D), stick FIGS. 2D), to 3D lifelike characters. A library of pre-rendered graphical actions may be applied to bring animations to the modelization of each avatar, which the post-production system 119 selects based on the learning, environment, physiology and motion activities detected from the user, in order to form a continuous stream of multimedia avatar content. The library of pre-rendered graphical actions may be implemented as a special effect library 122. The special effects of avatars may be pre-rendered by the avatar production system 110 or received by the avatar production system 110 from another source. In some embodiments, the avatar production system 110 may render a two-dimensional or three-dimensional representation of an avatar. It may pre-render one or more special effects associated with the avatar by animating the representation of the avatar to follow one or more actions. Then it may store the one or more special effects in a library comprising the plurality of pre-computed special effects (e.g., the special effect library 122).

The avatar production system 110 may comprise a data analyzer 114 that may analyze data associated with a user's studying activities and environmental events. The data analyzer 114 may obtain data associated with a user's studying activities from the online education platform 130. The online education platform 130 may comprise a studying data capturing system 131 that may be implemented as part of the online education platform 130 by software, hardware, or a combination thereof. The studying data capturing system 131 may be configured to monitor one or more studying activities of a user on the online education platform 130 and recording data associated with the user's studying activities.

In some embodiments, a user's learning/studying activities are captured in real-time from the online education platform 130 by the studying data capturing system 131 when that User is accessing learning services provided by the online education platform 130. The online education platform 130 shares the captured data with the avatar production system 110 for analysis and modeling.

In some embodiments, a user's learning/studying activities are generally classified as Passive, Active, Recall (PAR) with Passive defined as reading (no content gets created), Active defined as adding notes, asking questions (creating content) and Recall defined as testing (answering questions for the purpose of being tested). In some embodiments, the captured PAR activities, along with their related content references, may be used by the video production system 118 and the post-production system 119 to construct a virtual representation of avatars performing similar type of activities, with similar type of content, providing the user with virtual studying companionship.

For instance, a user's Passive activities, such as reading the "Biology 101, Chapter 3" textbook, can be translated into having one or more avatars in "Student" role reading the same, or different, textbook or chapter. Because the act of reading is typically associated to a quiet environment, having an avatar reading while the user is reading as well, specifically when projected into a typical reading environment, such as a virtual library background for example, provides direct support to the user while reading.

As another example, a user's Active activities, such as taking notes or asking a question, can be translated by the video production system 118 and the post-production system 119 into one or more avatars in "Student" role performing similar activities. Because the act of taking a note, or asking a question into a chat, is typically associated with using a pen, keyboard, or other type of input device, the "Student" role avatars may go through similar activities when projected into their virtual background, such a classroom or library.

As yet another example, a user's Recall activities, such as taking a SAT examination or other form of tests, can be translated by the video production system 118 and the post-production system 119 into having avatars in "Student" roles performing the same type of tests in virtual background that duplicate an official SAT test location or university auditorium.

The avatar production system 110 may further comprise a environmental data capturing system 115 for capturing environmental, physiology, or motion data associated with a user. These data is collectively captured using one or more user devices 140a connected to the avatar production system 110. Such devices 140a may comprise, for example, smartphones, smartwatches, connected speakers, or fitness bands.

The user's environmental data, if present, may be captured in real-time to detect and monitor environmental conditions during a studying session. The environmental data capturing system 115 may leverage a combination of connected sensors 141 to capture environmental data including, for example, ambient temperature, humidity level, ambient noise level, and local conversations. In some embodiments, environmental data may provide background information to the avatar production system 110 for updating the modelization of the avatars to provide notifications to the user, or alternatively to make these avatars appear to react to the environmental conditions of the user. For example, in response to detecting a substantial increase in ambient noise level, an avatar of the "Librarian" role may be streamed to the user to remind the user to reduce the noise level and study in a quiet environment.

The user's motion data, if present, may be captured in real-time to detect certain type of body movements from the user, such as standing up, sitting, walking or stretching. This type of motion tracking information may be used by the avatar production system 110 to adjust the position of the avatars in the virtual background, to make these avatars appear to react to the motion of the user. The avatar production system 110 may model and create motions of avatars based on the user's preferences of the "activities synchronicity" category.

The user's physiology data, if present, may be captured in real-time to detect certain types of physiology information about the user while studying, including, for example, heart rate, oxygen level, blood pressure and dehydration. Based on such data, the avatar production system may make avatars appear to react to the captured physiology data of the user.

The data analyzer 114 may aggregate and analyze data associated with the user's studying activities received from the online education platform 130 and the environmental, physiology, and motion data associated with the user received from the user devices 140a. Based on the analysis, the data analyzer 114 may detect one or more events associated with the user in real time. The detected events may be fed into the video production system 118 and the post-production system 119 to inform their selection of appropriate avatars, backgrounds, and special effects for use in generating a multimedia stream to send to the one or more display devices 140b.

The avatar production system 110 may comprise a video production system 118 for modeling activities of avatars and producing videos displaying activities of avatars. In some embodiments, the avatars' possible actions or reactions are computed ahead of time because there are only a limited and predictable number of activities applicable to all avatars by the video production system 118 and the post-production system 119. These actions or reactions may be referred to as special effects of the avatars. For instance, every 2D/3D representation of an avatar, may be programmed to follow several predetermined actions. The action that an avatar is modeled to carry out for a particular use case may be selected based on the captured data from the user's studying session, including learning, environmental, motion, or physiology data. The pre-determined actions may be stored in a library of special effects 122.

The computed special effects of avatars may include "studying" special effects that may include, for example, "standing up," "siting down," "stretching," "looking up," "opening a book," "flipping pages of a book," 'writing a question." Such special effects are motion related activities that can be pre-calculated and applied to any avatars during the streaming of that avatar. Additional special effects may include, for example, "the pace of reading pages of a particular section of a textbook," "the presence or absence of the writing of personal notes," "the number of correct or incorrect answers provided to a quiz or test," "the time remaining in learning session," "thumps-up," "thumbs-down," "keep going for another 15 minutes," "asking for calm," "walking towards the student," "staring at the student through the display," "open a window because it is too hot here," "drink a glass of water," "take a deep breath," or "asking the student to stop creating a disturbance." The above actions may be stored as part of the special effects library 122, which are modelized through the production of video only avatars, combination of video and audio, or a combination of a video and text overlay content.

The video production system 118 may select a special effect to apply based on a user's preferences and events detected by the data analyzer 114 based on data associated with the user's studying activities on the online education platform 130 and the environmental, physiology, and motion data captured by the user devices 140a and shared with the avatar production system 110. The video production system 118 may combine one or more selected avatars and one or more selected special effects to generate a multimedia stream displaying animation of the avatars using the special effects.

The avatar production system 110 may comprise a post-production system 119 for post-processing avatars and special effects. The post-production system 119 may take the already processed, and animated avatars, to merge them into a selected virtual background, or scenes. The post-production system 119 may merge the animated avatars with the virtual background using any appropriate techniques, such as the techniques of green screens. The resulting content may comprise video only content, a combination of video and audio, or a combination of video and text overlay content.

The avatar production system 110 may comprise an audio/video packaging and streaming system 120 for encoding and packaging the multimedia content generated by the post-production system 119. The encoded and packaged multimedia content may be streamed via a content distribution network to the display devices 140b.

Figure 2:
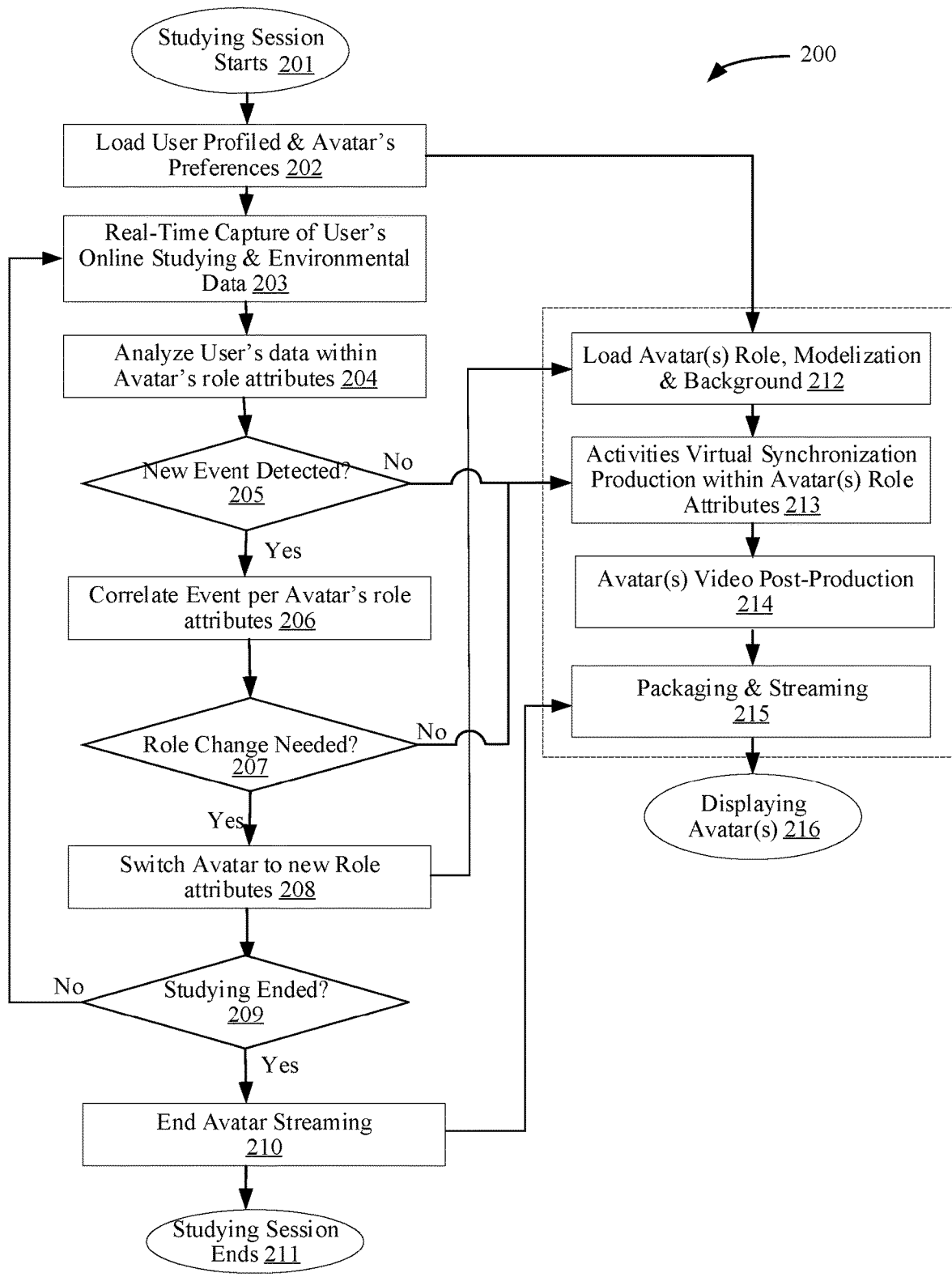
FIG. 2 illustrates an example workflow for providing personalized multimedia avatars for virtual studying companionship.

FIG. 2 illustrates an example workflow 200 for providing personalized multimedia avatars for virtual studying companionship. The workflow 200 may be carried out by one or more of the components of the system 100 as shown in FIG. 1. Depending on the implementation, the workflow 200 may include additional, fewer, or alternative steps performed in various orders or in parallel. The devices or systems performing certain steps as illustrated in the workflow 200 may be substituted by other suitable devices or systems to perform the same steps. The suitable devices or systems may comprise sub-systems, parent systems, or counterpart systems with similar functionalities.

The workflow 200 may start at step 201, where it may be determined that a user's studying session has started or in session. At step 202, the avatar production system 110 may load or access a user profile associated with the user and the user's preferences regarding avatars. The user preferences may be loaded by the preference management system 112. After loading or accessing the user profile and user preferences, the avatar production system 110 may load one or more default avatars (e.g., tutor role, student role, librarian role) for the user according to the user preferences at step 212. Specifically, the avatar production system 110 may load information associated with one or more roles of the one or more loaded avatars, 2D/3D modelization of the one or more avatars, and a background. The loaded avatars and background may be specified by one or more user preferences. Alternatively, the loaded avatars or background may be selected based on system settings associated with the avatar production system 110 that may or may not be customized by the user.

At step 203, the avatar production system 110 may capture real-time data associated with the user, including data associated with the user's studying or learning activities received from the online education platform 130 and data associated with the user's environmental, physiology, and motion data received from user devices 140a. In some embodiments, the avatar production system 110 may capture one or more current online activities of the user carried on the online education platform 130 that is providing learning services to the user. The learning services may comprise, for example, educational content services comprising electronic textbooks, flash cards, or tutorial videos, online question-and-answer services, online testing services, other suitable online learning services, or any combination thereof. Accordingly, the current online activities of the user may indicate that the user is viewing flash cards, or watching a tutorial video, and so on. In some embodiments, the avatar production system 110 may capture or receive sensor data from one or more electronic devices 140a of the user regarding the user's environment, the user's physiology conditions, and/or the user's motions. As an example, the avatar production system 110 may capture or receive user's heart rate from the user's watch.

At step 204, the avatar production system 110 may analyze the user's online data and/or environmental, physiology, and motion data in light of the role attributes of avatars available to be created by the avatar product system 110. The analysis may be carried out by the data analyzer 114 and may comprise analysis of one or more captured ongoing or real-time activities of the user on the online education platform 130, the sensor data received from the user's electronic devices 140a, or any combinations thereof. The role attributes may be managed and maintained by the avatar role and attribute management system 113. In some embodiments, the role attributes of the avatars may specify detected events that would trigger the generation of avatars of pre-determined roles performing pre-determined actions corresponding to the detected events. At step 205, avatar production system 110 may determine, based on the analysis of the user's online data, whether a event specified by the avatars' role attributes is detected.

In some embodiments, the event may comprise activities of the user on the online education platform 130. Such activities may comprise, for example, reading a textbook, taking notes, asking a question, taking an examination, other suitable online learning activities, or any combination thereof. In some embodiments, the event may comprise a change in environmental conditions. A change in environmental conditions may comprise a change in an ambient temperature, a change in a humidity level, a change in an ambient noise level, other suitable environmental events, or any combination thereof. In some embodiments, the event may comprise a movement of the user. The movement of the user recognized by the avatar production system 110 may comprise, for example, standing up, sitting, walking, yawning, stretching, other suitable motions, or any combination thereof. In some embodiments, the event may comprise a change in a physiology condition of the user. The change in the physiology condition of the user may comprise, for example, a change of heart rate, a change of body temperature, a change of oxygen level, a change of blood pressure, dehydration of the user, other suitable physiology conditions, or any combination thereof. In some embodiments, events may further be determined based on a period of time lapsed for a certain activity or the lack of an activity. Such events may comprise, for example, reading a textbook for a period of time, viewing a particular question for a period of time, a lack of movement for a period of time, other suitable time-based events, or any combination thereof. The detected event may also comprise a combination of any of the aforementioned example events or other suitable events associated with the user.

In some embodiments, if it is determined that a new event has been detected at step 205, the workflow 200 may proceed to step 206. Otherwise, the workflow 200 may proceed to step 213.

At step 213, the avatar production system 110 may create multimedia content associated with the avatars loaded at step 212. The multimedia content may be created by the video production system 118. The multimedia content may comprises video, a combination of video and audio, a combination of video and text overlay content, other suitable multimedia content, or any combination thereof. The avatar production system 110 may create the multimedia content based on one or more role attributes of the one or more avatars loaded at step 212. The one or more attributes of the one or more avatars may comprise one or more pre-determined rules mapping avatars and special effects to events. They may specify one or more default special effects when no new event is detected. The default special effects may be synchronized with detected learning activities of the user on the online education platform 130. In some embodiments, the avatar production system 110 may create the multimedia content by applying the special effects to the modelization of the one or more loaded avatars. Then, the workflow may proceed to perform steps 214-216 to provide the multimedia content to the user. At step 214, the avatar production system 110 may post-produce the multimedia content by projecting the avatars and the special effects on a virtual background. This step may be performed by the post-production system 119. Here, the virtual background used may be a default background according to system settings or user preferences. At step 215, the avatar production system may encode and package the multimedia content into a multimedia stream. It may then stream the multimedia content to the display device 140b of the user. Step 215 may be performed by the audio/video packaging and streaming system 120. At step 216, the multimedia stream of the avatars may be displayed by the display device 140b.

At step 206, the avatar production system 110 may correlate the newly detected event with one or more avatar roles based on role attributes of the one or more avatars. The role attributes of the avatars available for production by the avatar production system 110 may comprise a plurality rules mapping the avatars to events detected. For example, for each avatar, the role attributes of the avatar may comprise a list of events in response to which the avatar may be displayed. At step 206, the avatar production system 110 may select the avatars from a library comprising a plurality of avatars. For example, it may search the avatar database 116 to identify one or more avatars whose attributes comprise the new event detected at step 205. In some embodiments, the avatar production system 110 may select, based on the detected event, one or more roles from a plurality of available roles of avatars. It may then select avatars that are of the selected roles based on user preferences. The available roles of avatars may comprise a student, a tutor, a librarian, other suitable roles, or any combination thereof.

At step 207, the avatar production system 110 may determine if a role change is needed. For example, the avatar production system 110 may compare the roles of one or more avatars identified at step 206 with the roles of avatars loaded at step 212. If the roles are different, the avatar production system 110 may determine that a role change is needed. Otherwise, if the roles are the same, the avatar production system 110 may determine that role change is not needed.

In some embodiments, if it is determined that a role change is needed, the workflow 200 may proceed to step 208. Otherwise, the workflow 200 may proceed to step 213.

At step 213, the avatar production system 110 may create multimedia content associated with the avatars loaded at step 212. The avatar production system 110 may create the multimedia content based on one or more role attributes of the one or more loaded avatars. Here, because a new event was detected, the avatar production system 110 may identify one or more special effects matched to the new event. The avatar production system 110 may select the one or more special effects from a library (e.g., the special effect library 122) comprising a plurality of pre-rendered special effects each corresponding to at least one of the plurality of avatars. The one or more special effects may be determined based on one or more rules included as part of the role attributes that map special effects to detected events.

The special effects may be customized and synchronized with one or more detected activities of the user based on data from the online education platform 130 or sensor data from one or more user devices 140a. In some embodiments, the avatar production system 110 may select one or more actions by at least one of the one or more avatars based on a detected activity of the user. The one or more actions of the one or more avatars may be the same as or similar to the detected activity of the user. For example, the avatar production system 110 may determine that the user is taking an examination. It may accordingly generate one or more avatars also taking an examination to provide the appearance that the user is taking an examination with a number of other students. In some embodiments, the avatar production system 110 may further determine one or more points in time associated with the one or more selected actions. The avatar production system 110 may then generate one or more special effects representing the at least one of the one or more avatars performing the selected one or more actions at the one or more points in time, respectively. For example, an avatar representing a studying student may be animated such that it stands up and walk around every thirty minutes, which may provide a reminder to the user to take a break from studying. In some embodiments, the avatar production system 110 may determine a duration of the detected activity of the user and triggering a special effect when the duration of the detected activity reaches a threshold. For example, the avatar production system 110 may determine that a student has not moved for more than an hour and trigger a special effect of an avatar drinking a glass of water to remind the user to get hydrated. In some embodiments, the avatar production system 110 may identify content accessed by the user on the online education platform and customize the one or more special effects based on the content accessed by the user. For example, the avatar production system 110 may identify that the user is reading the e-textbook Biology 101 on the online education platform 130. The avatar production system 110 may create an avatar in the student role also reading Biology 101, thereby giving the user the appearance of studying the same subject with a classmate.

The avatar production system 110 may create the multimedia content by applying the identified special effects on the modelization of the avatars. Then, the workflow may proceed to perform steps 214-216 to provide the multimedia content to the user. At step 214, the avatar production system 110 may post-produce the multimedia content by projecting the avatars and the special effects on a virtual background. This step may be performed by the post-production system 119. The virtual background may be selected based on one or more rules mapping backgrounds to events. The avatar production system 110 may identify a background that matches the detected event and map the avatars and special effects on the identified background. At step 215, the avatar production system may encode and package the multimedia content into a multimedia stream. It may then stream the multimedia content to the display device 140b of the user. Step 215 may be performed by the audio/video packaging and streaming system 120. At step 216, the multimedia stream of the avatars may be displayed by the display device 140b.

At step 208, in response to determining that a role change is needed, the avatar production system 110 may switch the currently displayed avatars to avatars having new roles and corresponding role attributes. The workflow 200 may then proceed to the steps 212-216. The steps 212-216 are performed is a way essential the same as described above. The avatar production system 110 may load one or more new avatars and their role attributes, modelization, along with a virtual background selected based on the newly detected event. The avatar production system 110 may apply special effects selected based on the newly created event on the avatars and project the avatars on the virtual background to create multimedia content, encode and package the multimedia content, and stream the multimedia content to the display device 140b for display to the user.

At step 209, the avatar production system 110 may determine whether a current studying session of the user has ended. The determination may be performed based on information received from the online education system 130. The determination may be performed periodically during a studying session. The frequency of the determination may be set by the avatar production system 110 or be controlled by one or more user preferences. Alternatively, the determination may be triggered by certain conditions. For example, when an event is detected, the avatar production system 110 may analyze data related to the user's studying activities and environment conditions to determine if the event has ended. When a current event is ended, the avatar production system may analyze if the studying session has ended. If not, the avatar production system 110 further analyzes the data to determine the next piece of multimedia content to stream to the user given that the current event has ended.

If it is determined at step 209 that the current studying session has not ended, the workflow may return to step 203. The avatar production system 110 may repeat the steps 203-209 to determine if new events occur and if the currently streamed avatars, special effect, and background need to be changed. If so, the avatar production system 110 may perform some or all of steps 212-216 to implement the changes. As shown in FIG. 2, the avatar production system 110 may perform one or more loops of at least part of the steps shown during a studying session. This looped process allows the avatar production system 110 to adjust the multimedia content streamed to the user based on real-time data related to the user's activities. Such a technique may provide the user the apprehension of a real-world scenario where the environment and other people's behavior are responsive to the user's own behavior. It may also facilitate providing the avatars and special effects most appropriate for the user's current studying needs.

If it is determined at step 209 that the current studying session has ended, the workflow may proceed to step 210, where the avatar production system 110 may end avatar streaming. For example, instructions may be sent to the audio/video packaging and streaming system 120 such that the audio/video packaging and streaming system 120 stops to perform step 215, and thus terminate the streaming of the multimedia content to the display device 140b. Step 211 then marks the end of the study session.

Figure 3:
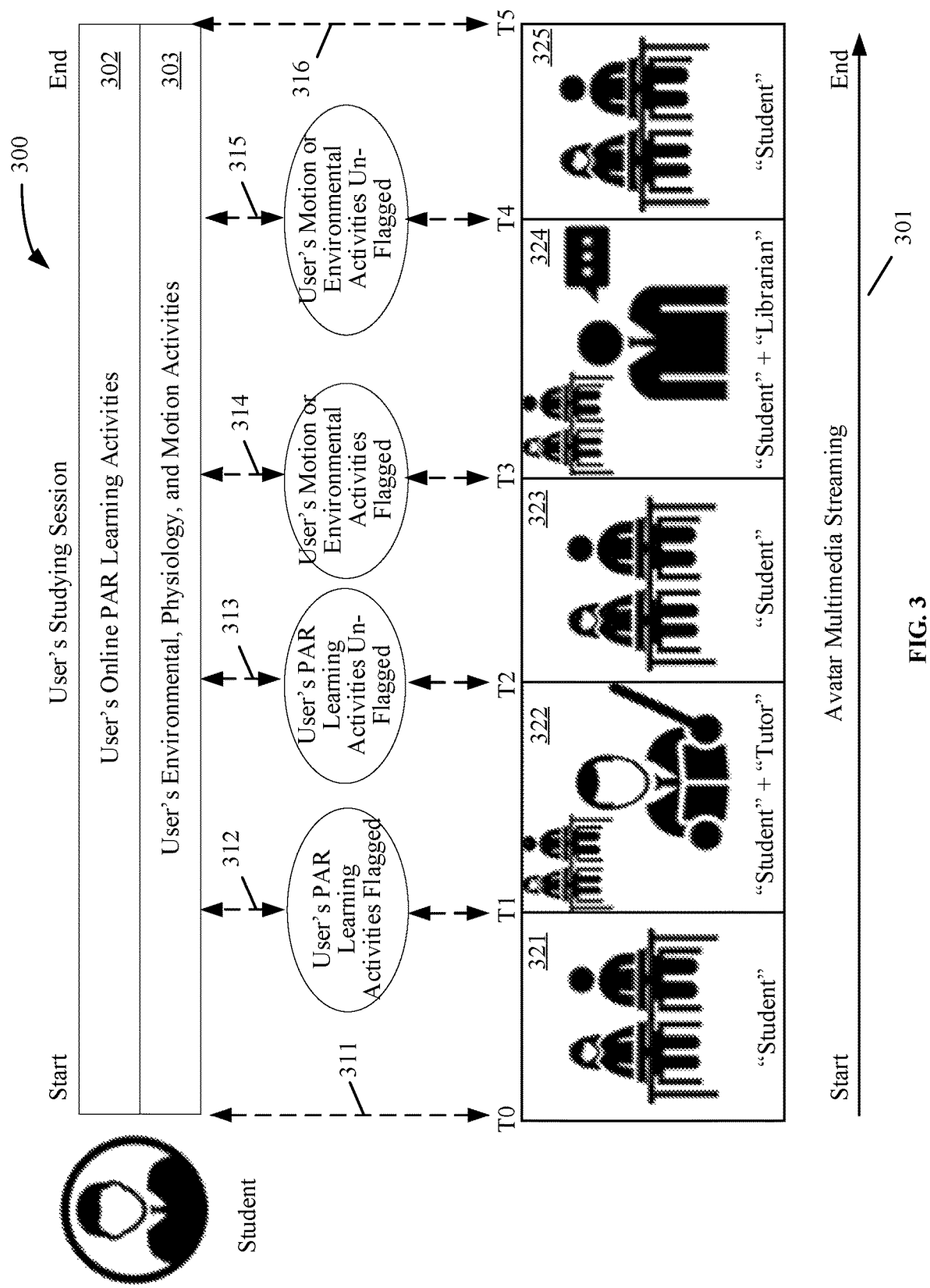
FIG. 3 illustrates an example timeline for providing a user experience with changing multimedia avatars responsive to detected user activities.

FIG. 3 illustrates an example timeline 300 for providing a user experience with changing multimedia avatars responsive to detected user activities. The horizontal axis of FIG. 3 illustrates a time period from the beginning to the end of a user's studying session. As shown by the time arrow 301, multimedia content showing avatars may be streamed to display devices of a user throughout the studying session. Alternatively, the multimedia content may also be streamed to display devices of the user for part of the time period of a study session. During the studying session, an avatar production system (e.g., the avatar production system 110) may constantly or periodically gather data associated with the user's online PAR (Passive, Active, Recall) learning activities 302 and data associated with the user's environmental, physiology, and motion activities. 303. The avatar production system may dynamically stream multimedia content showing avatars customized to the user and synchronized with the user's activities to one or more display devices of the user.

The studying session may start at a time point 311. Before any event is detected, the avatar production system may stream one or more default avatars to the user. The multimedia stream may be created based on one or more preferences of the user. For example, in this case, the avatar production system may stream the multimedia stream 321 showing two avatars having the role "Student" studying.

The while streaming the default avatars to the user, the avatar production system may continue to analyze data associated with user activities and determine if an event is detected. At a time point 312, the avatar production system may detect and flag a recognized event about the user's learning activities. For example, the flagged event may include that the user studying a chapter of a textbook for a period of time longer than an expected period of time based on historical data of other students studying the same chapter. As another example, the flagged event may include that a student achieving a below-average correct rate for a quiz. In response to flagging the event, the avatar production system may create multimedia content 322 comprising one or more avatars, one or more special effects, and a virtual background for streaming to the user. For example, in recognizing that the user may have encountered a difficulty in the current learning task, the avatar production system may display an avatar with the role "Tutor" in the multimedia stream. The tutor avatar may be displayed in addition to (as illustrated in FIG. 3) or in alternative to the two student avatars. This may signal to the user that it may be time to seek help using tools of the online education system.

At a time point 313, the avatar production system may determine that the flagged event has ended and proceed to unflag the event. For example, the avatar production system may determine that the user has moved on to the next problem. At this time point 313, the avatar production system may resume streaming of the default multimedia content 323 (here, as illustrated, two student avatars) to the user.

At a time point 314, the avatar production system may detect and flag a new event about the user's environment. For example, the flagged event may include that there is an abnormally high level of ambient noise in the user's environment. In response to flagging this event, the avatar production system may create multimedia content 324 for streaming to the user. For example, in recognizing the level of ambient noise in the user's environment, the avatar production system may display an avatar with the role "Librarian" in the multimedia stream. The avatar may be animated to walk toward the screen or the user. This avatar may give the user the appearance that the user is working in a quiet environment and that the user should reduce the noise in the environment to concentrate on studying. As illustrated in FIG. 3, the librarian avatar is saying something to the student (e.g., telling the user to reduce noise levels), in addition to the two student avatars being present.

At a time point 315, the avatar production system may determine that the flagged event has ended and proceed to unflag the event. For example, the avatar production system may determine that the ambient noise in the user's environment has been reduced to a normal level. At this time point 315, the avatar production system may resume streaming of the default multimedia content 325 (here, two student avatars) to the user. This content may be streamed until the end of the study session, marked by the time point 316.

Figure 4B:
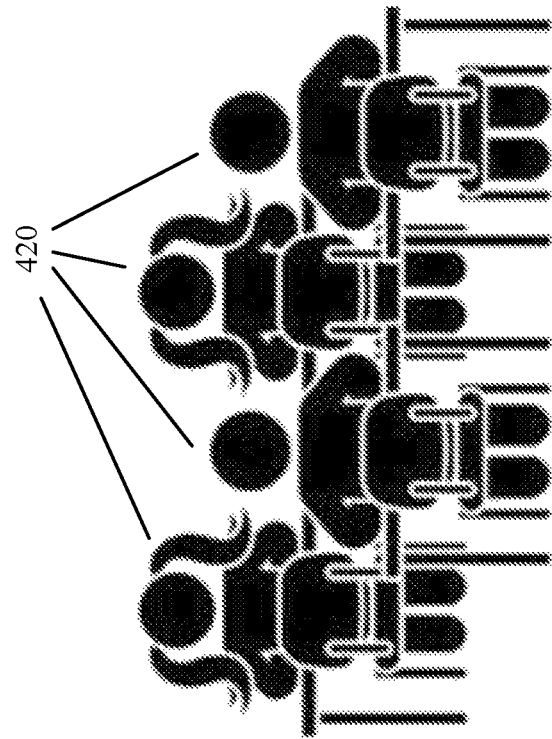
FIGS. 4A-4F illustrates additional example avatars streamed for display to a user.
Figure 4A:
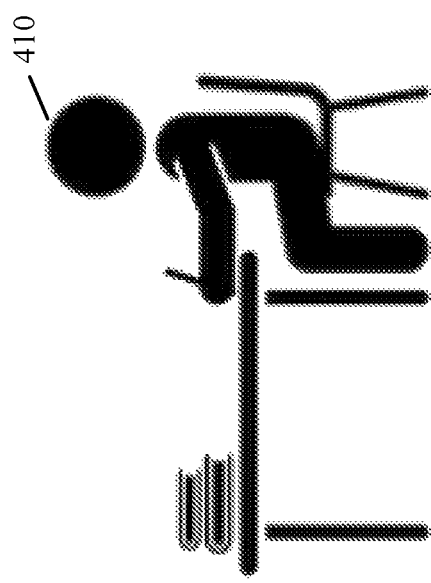
Figure 4C:
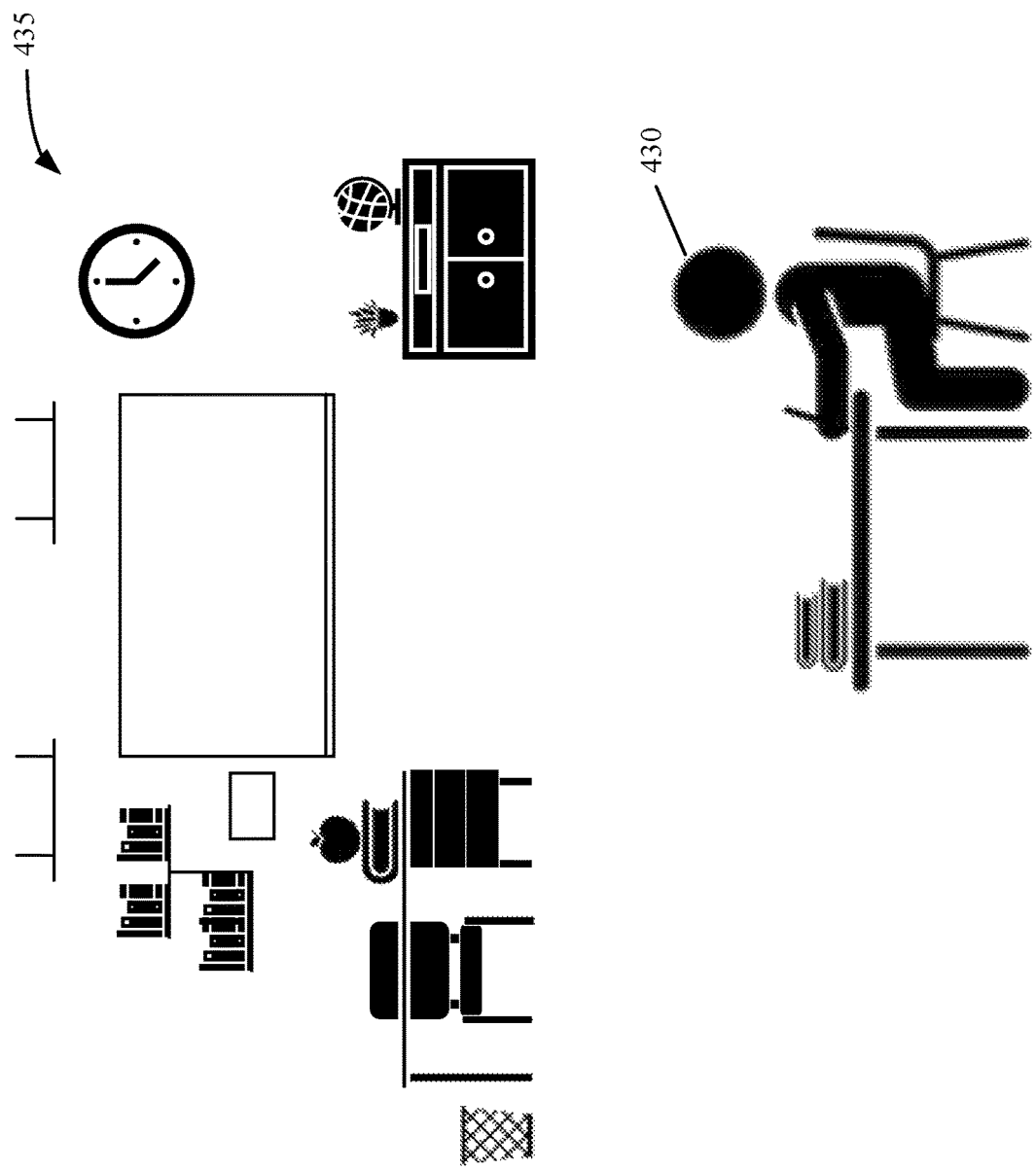
Figure 4D:
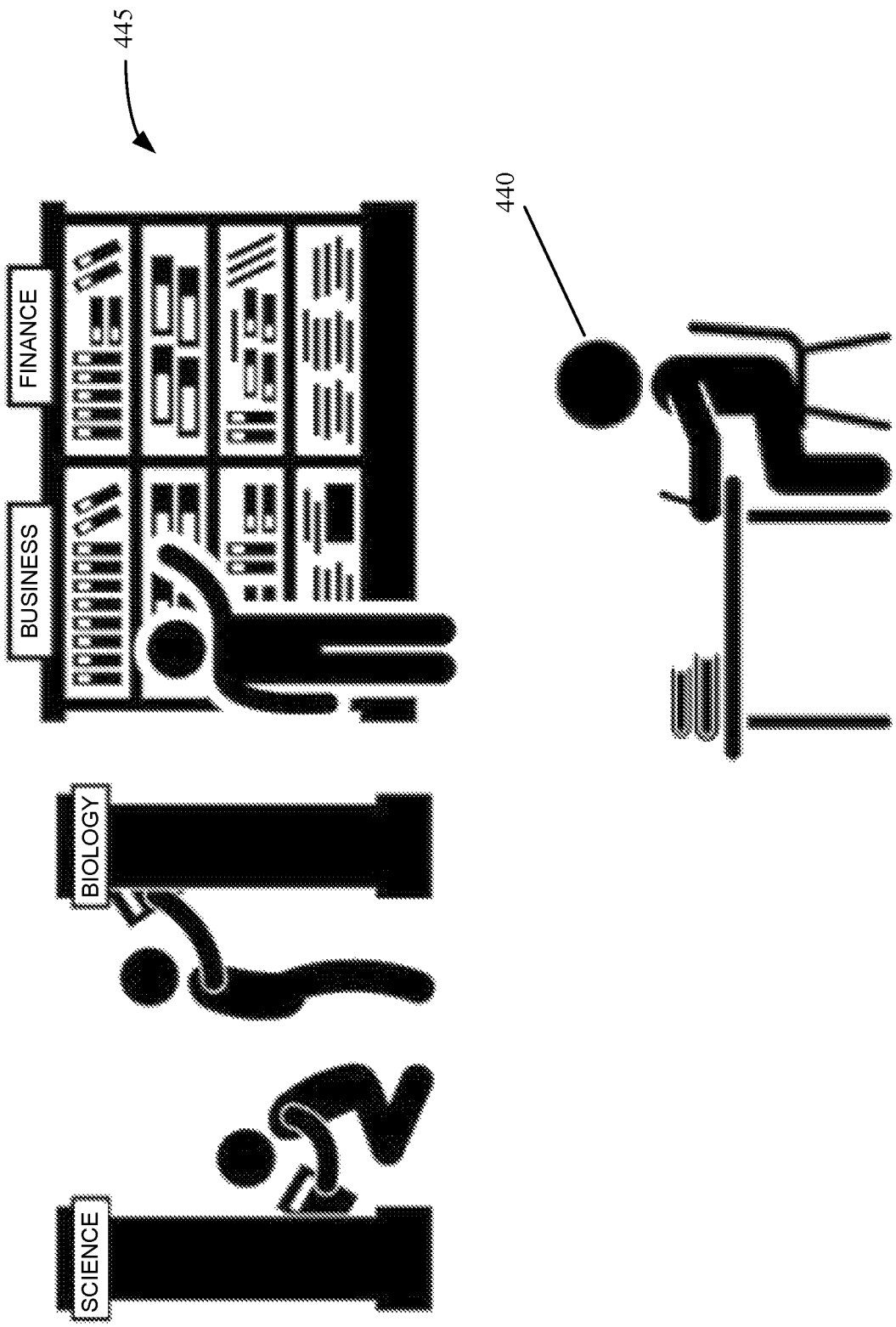
Figure 4E:
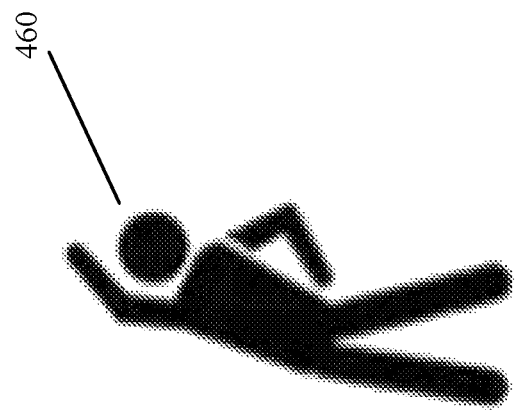
Figure 4F:
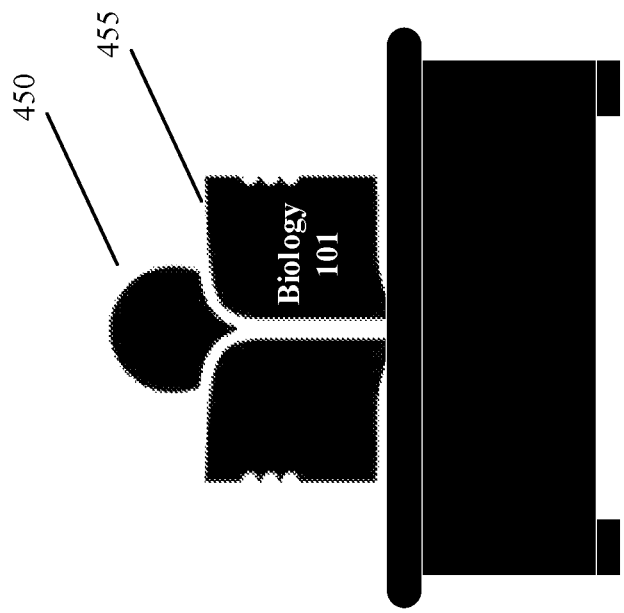

FIGS. 4A-4F illustrates additional example avatars streamed for display to a user. In some embodiments, an avatar production system may determine the quantity of avatars to stream to a user depending on detected events and the user's preferences. For example, the avatar production system may create one student avatar to provide companionship for a user that is reading a book quietly. The avatar production system may create a classroom full of student avatars to provide the user an appearance of taking an examination along with a number of other students. FIG. 4A illustrates a multimedia stream having one student avatar 410. FIG. 4B illustrates a multimedia stream having a plurality of student avatars 420. In some embodiments, the avatar production system may select a virtual background and project one or more avatars in the virtual background in rendering the multimedia stream. For example, FIG. 4C illustrates a student avatar 430 being projected in a virtual background 435 representing a classroom. Other examples of virtual backgrounds may include cafés, libraries, study halls, etc. FIG. 4D illustrates a student avatar 440 being projected in a virtual background 445 representing a library. In some embodiments, the avatar production system may create a special effect of an avatar interacting with educational content. The educational content interacted with by the avatar may be chosen based on the content studied by the user on the online education system. For example, FIG. 4E illustrates a student avatar 450 reading a "Biology 101" textbook 455. This textbook may be chosen because the user is studying the same textbook or a related one. In some embodiments, the multimedia content may comprise avatars animated to perform activities or movements related to detected events. For example, FIG. 4F illustrates an avatar 460 stretching. Such a special effect may be displayed to a user after it is determined that the user has not moved for an extended period of time. Such a special effect may remind the user to take a break and relax a bit after intensive studying.

Figure 5:
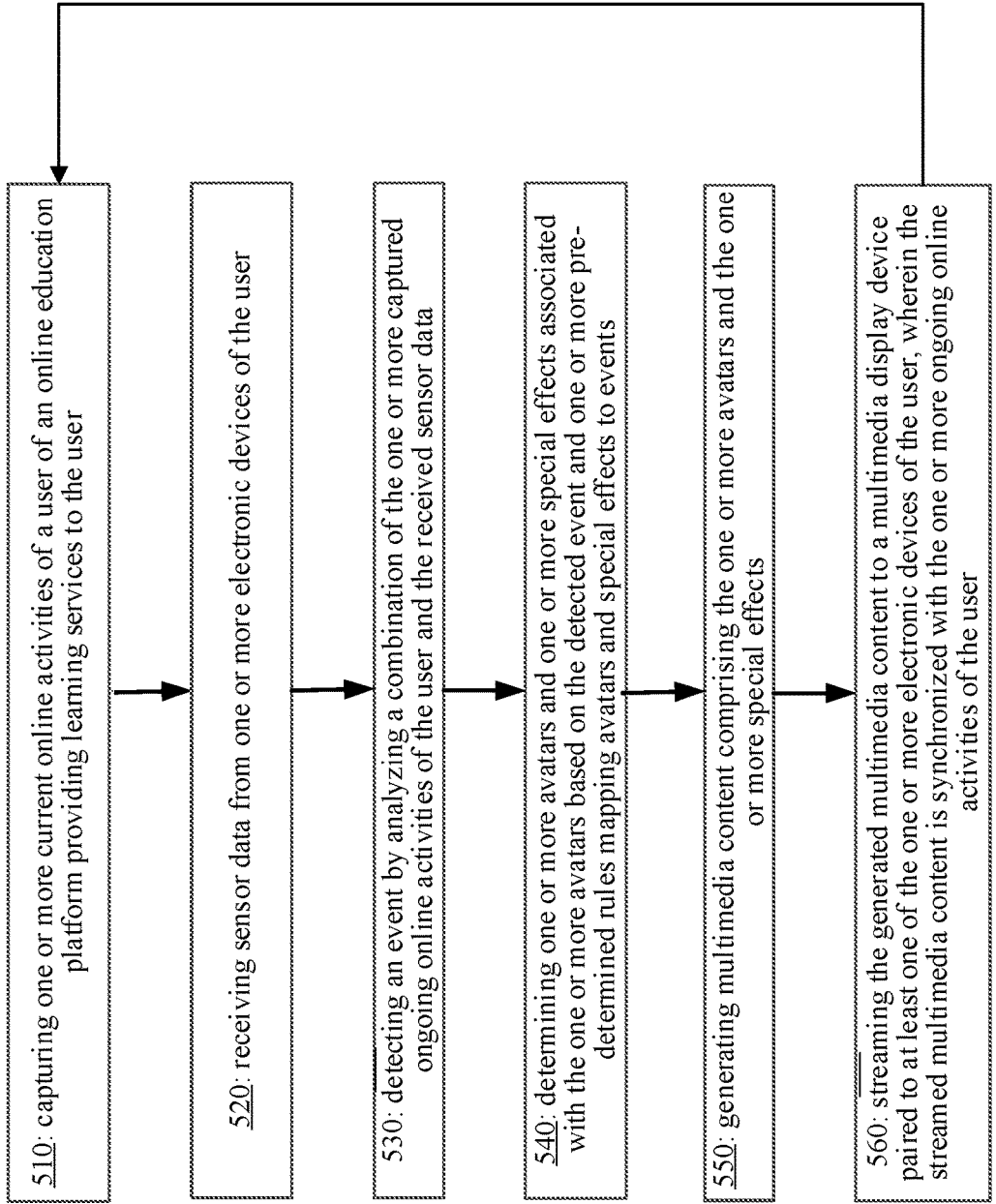
FIG. 5 illustrates an example method for providing personalized avatars for virtual companionship.

FIG. 5 illustrates an example method 500 for providing personalized avatars for virtual companionship. The method 500 may be performed by a device, apparatus, or system illustrated in FIG. 1 or 6, such as one or more components of the avatar production system 110. Depending on the implementation, the method 500 may include additional, fewer, or alternative steps performed in various orders or in parallel.

Block 510 includes capturing one or more current online activities of a user of an online education platform providing learning services to the user. The current online activities of a user may include the user's online activities in a current studying session and/or the user's online activities that occur as a multimedia stream is being presented to the user. While the user's current online activities may or may not be captured instantaneously as they occur, such current online activities exclude the user's online activities that occurred in previous studying sessions or that have been captured and stored as historical data. In some embodiments, the learning services may comprise educational content services comprising electronic textbooks, flash cards, or tutorial videos; online question-and-answer services; or online testing services.

Block 520 includes receiving sensor data from one or more electronic devices of the user.

Block 530 includes detecting an event by analyzing a combination of the one or more captured online activities of the user and the received sensor data. In some embodiments, the event may comprise a change in environmental conditions, the change in environmental conditions comprising: a change in an ambient temperature; a change in a humidity level; or a change in an ambient noise level. In some embodiments, the event may comprise a movement of the user, the movement of the user comprising: standing up; sitting; walking; yawning; or stretching. In some embodiments, the event may comprise a change in a physiology condition of the user, the change in the physiology condition of the user comprising: a change of heart rate; a change of body temperature; a change of oxygen level; a change of blood pressure; or dehydration.

Block 540 includes determining one or more avatars and one or more special effects associated with the one or more avatars based on the detected event and one or more predetermined rules mapping avatars and special effects to events. In some embodiments, the determining one or more avatars may comprise selecting, based on the detected event, one or more roles from a plurality of available roles of avatars, wherein each of the determined one or more avatars is of a role among the one or more selected roles. In some embodiments, the available roles of avatars comprise one or more of: a student; a tutor; or a librarian. In some embodiments, the determining one or more avatars may comprises: determining, based on the detected event, a quantity of avatars to present, wherein the determined one or more avatars consist of one or more avatars of the determined quantity. In some embodiments, the determining one or more avatars and one or more special effects may comprise: selecting the one or more avatars from a library comprising a plurality of avatars; and selecting the one or more special effects from a library comprising a plurality of pre-rendered special effects each corresponding to at least one of the plurality of avatars.

Block 550 includes generating multimedia content comprising the one or more avatars and the one or more special effects. In some embodiments, the multimedia content may comprise: video; a combination of video and audio; or a combination of video and text overlay content. In some embodiments, the generating the multimedia content may comprise: detecting an activity of the user based on the one or more captured online activities and the received sensor data; customizing the one or more special effects based on the detected activity; and generating the multimedia content based on the one or more customized special effects. In some embodiments, the customizing the one or more special effects based on the detected activity may comprise: selecting one or more actions by at least one of the one or more avatars based on the detected activity of the user, wherein the one or more actions are the same as or similar to the detected activity; determining one or more points in time associated with the one or more selected actions; and generating one or more special effects representing the at least one of the one or more avatars performing the selected one or more actions at the one or more points in time, respectively. In some embodiments, the customizing the one or more special effects based on the detected activity may comprise: determining a duration of the detected activity; and triggering a special effect when the duration of the detected activity reaches a threshold.

In some embodiments, the generating the multimedia content may comprise: determining a virtual background based on the detected event; and projecting the one or more avatars on the virtual background. In some embodiments, the generating the multimedia content may comprise: identifying content accessed by the user on the online education platform; customizing the one or more special effects based on the content accessed by the user; and generating the multimedia content based on the one or more customized special effects. In some embodiments, the customizing the one or more special effects based on the content accessed by the user comprises: selecting content to be interacted with by at least one of the one or more avatars based on the content accessed by the user; and generating a special effect representing the at least one of the one or more avatars interacting with the selected content, wherein selected content comprises the content accessed by the user, content related to the content accessed by the user, or random content.

Block 560 includes streaming the generated multimedia content to a multimedia display device of the user, wherein the streamed multimedia content is synchronized with the one or more online activities of the user. The streamed multimedia content is synchronized with the one or more online activities of the user in that the multimedia content is streamed to the user for at least part of a studying session during which the user performs the online activities and that avatars, special effects, or virtual backgrounds in the multimedia content are dynamically adjusted or updated based on the user's online activities as the multimedia content is streamed to the user. In some embodiments, the method 500 may further comprise determining that the detected event has ended; and streaming default multimedia content to the multimedia display device of the user.

In some embodiments, the method 500 may further comprise, prior to capturing one or more online activities of a user on an online education platform, for one of the plurality of avatars: rendering a two-dimensional or three-dimensional representation of the avatar; pre-rendering one or more special effects associated with the avatar by animating the representation of the avatar to follow one or more actions; and storing the one or more special effects in the library comprising the plurality of pre-computed special effects.

The steps of method 500 may be repeated a plurality of times during a studying session. After performing the step in block 560, the method may return to the step in 510 and repeat the method 500. Execution of the method 500 may be terminated after it is determined that a studying session of a user has ended.

Figure 6:
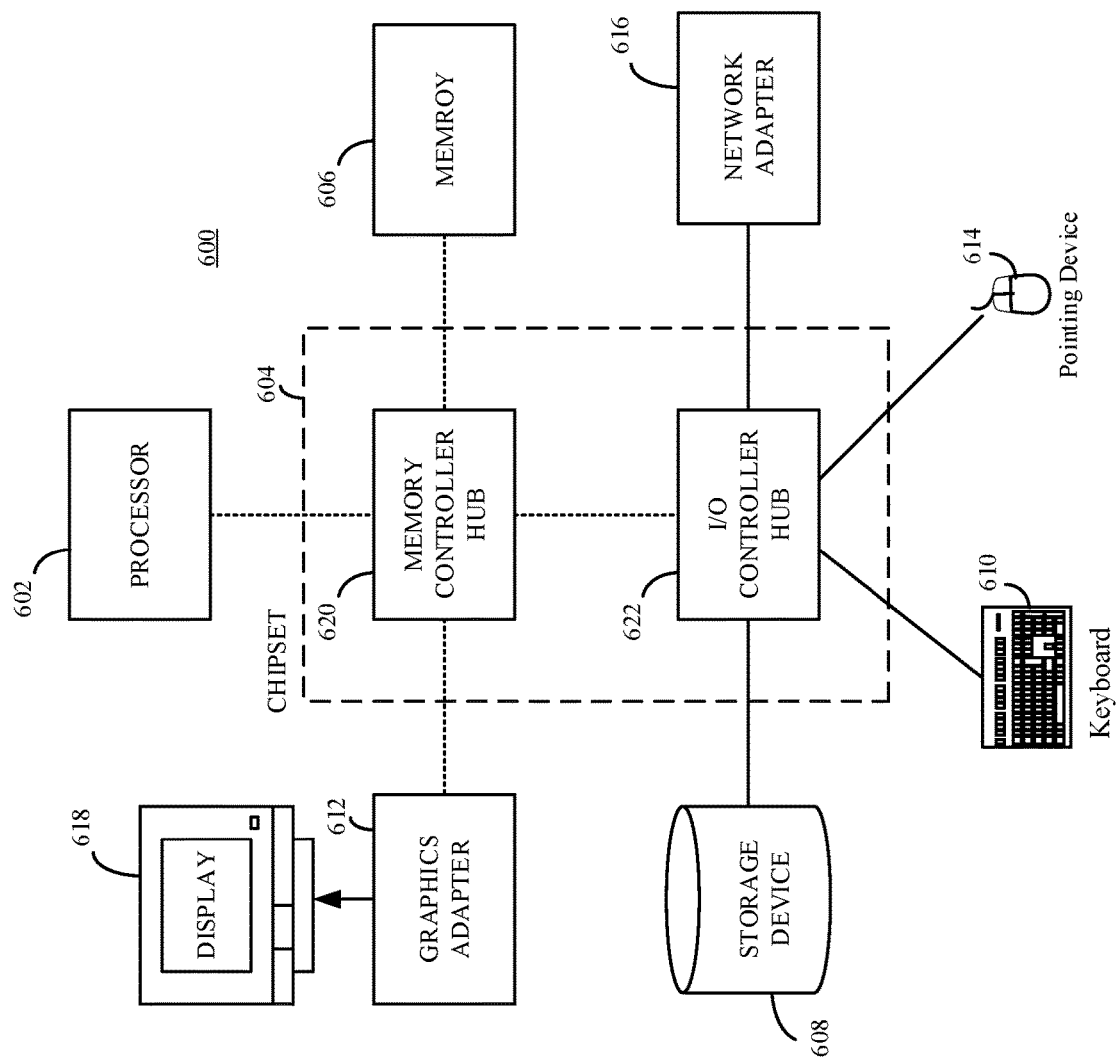
FIG. 6 illustrates a block diagram of a computer system in which any of the embodiments described herein may be implemented.

FIG. 6 illustrates a block diagram of a computer system 600 in which any of the embodiments described herein may be implemented. For example, the computer system 600 may be used to implement at least part of one or more computing devices associated with the online education platform 130, one or more computing devices associated with the avatar production system 110, one or more display devices 140b, and one or more user devices 140a as shown in FIG. 1. The computer system 600 may further execute the methods, workflows, and processes disclosed herein. Illustrated are at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display device 618 is coupled to the graphics adapter 612. A storage device 608, keyboard 610, pointing device 614, and network adapter 616 are coupled to the I/O controller hub 622. Other embodiments of the computer 600 have different architectures. For example, the memory 606 is directly coupled to the processor 602 in some embodiments.

The storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, or other type of pointing device, and is used in combination with the keyboard 610 to input data into the computer 600. The graphics adapter 612 displays images and other information on the display device 618. The network adapter 616 couples the computer 600 to a network. Some embodiments of the computer 600 have different and/or other components than those shown in FIG. 6. The types of computer 600 can vary depending upon the embodiment and the desired processing power.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and the figures are not intended to require that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific embodiments, various modifications and changes may be made to these embodiments without departing from the broader scope of embodiments of the specification. The Detailed Description should not to be taken in a limiting sense, and the scope of various embodiments is defined only by the appended claims, along with the full range of equivalents to which such claims are entitled. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned.

The invention claimed is:

1. A method for providing personalized avatars for virtual companionship, comprising:
   providing educational content of an online education platform for display on a first display device of a user;
   capturing one or more current online activities of the user including interactions with the educational content displayed on the first display device by the user;
   receiving sensor data from one or more electronic devices of the user;
   detecting an event by analyzing the one or more captured online activities of the user and the received sensor data;
   selecting, automatically without user input, an avatar role from a plurality of avatar roles and a virtual background from a plurality of virtual backgrounds based on the detected event, wherein each of the virtual backgrounds represents a virtual space in which avatars can be placed;
   determining one or more avatars of the selected avatar role and one or more special effects associated with the one or more avatars based on the detected event and one or more predetermined rules mapping avatars and special effects to events;
   generating multimedia content by projecting the one or more avatars and the one or more special effects on the virtual background; and
   streaming the generated multimedia content to a second display device of the user, the streamed multimedia content being synchronized with the one or more online activities of the user that include interactions with the educational content displayed on the first display device, wherein the streamed multimedia content is synchronized with the one or more online activities of the user by:
      determining the one or more special effects associated with the one or more avatars to include the one or more avatars interacting with virtual content identical to the displayed educational content in a manner identical to that of the interactions by the user, and
      generating the multimedia content to show that the one or more avatars interact with the virtual content at a set pace, wherein the set pace is determined based on a pace at which the user interacts with the educational content displayed on the first display device.

2. The method of claim 1, wherein the event comprises a change in environmental conditions, the change in environmental conditions comprising:
   a change in an ambient temperature;
   a change in a humidity level; or
   a change in an ambient noise level.

3. The method of claim 1, wherein the event comprises a movement of the user, the movement of the user comprising:
   standing up;
   sitting;
   walking;
   yawning; or
   stretching.

4. The method of claim 1, wherein the event comprises a change in a physiology condition of the user, the change in the physiology condition of the user comprising:
   a change of heart rate;
   a change of body temperature;
   a change of oxygen level;
   a change of blood pressure; or
   dehydration.

5. The method of claim 1, wherein the online education platform provides learning services comprising:
   educational content services comprising electronic textbooks, flash cards, or tutorial videos;
   online question-and-answer services; or
   online testing services.

6. The method of claim 1, wherein the generating the multimedia content comprises:
   detecting an activity of the user based on the one or more captured online activities and the received sensor data;

customizing the one or more special effects based on the detected activity; and generating the multimedia content based on the one or more customized special effects.

7. The method of claim 6, wherein the customizing the one or more special effects based on the detected activity comprises:

selecting one or more actions by at least one of the one or more avatars based on the detected activity of the user, wherein the one or more actions are the same as or similar to the detected activity;

determining one or more points in time associated with the one or more selected actions; and generating one or more special effects representing the at least one of the one or more avatars performing the selected one or more actions at the one or more points in time, respectively.

8. The method of claim 6, wherein the customizing the one or more special effects based on the detected activity comprises:

determining a duration of the detected activity; and triggering a special effect when the duration of the detected activity reaches a threshold.

9. The method of claim 1, wherein the plurality of avatar roles comprise one or more of:

a student;

a tutor; or a librarian.

10. The method of claim 1, wherein the determining one or more avatars comprises:

determining, based on the detected event, a quantity of avatars to present, wherein the determined one or more avatars consist of one or more avatars of the determined quantity.

11. The method of claim 1, wherein the determining one or more avatars of the selected avatar role and one or more special effects comprises:

selecting the one or more avatars from a library comprising a plurality of avatars; and selecting the one or more special effects from a library comprising a plurality of pre-rendered special effects each corresponding to at least one of the plurality of avatars.

12. The method of claim 11, further comprising, prior to capturing one or more current online activities of the user, for one of the plurality of avatars:

rendering a two-dimensional or three-dimensional representation of the avatar;

pre-rendering one or more special effects associated with the avatar by animating the representation of the avatar to follow one or more actions; and storing the one or more special effects in the library comprising the plurality of pre-rendered special effects.

13. The method of claim 1, wherein the multimedia content comprises:

video;

a combination of video and audio; or a combination of video and text overlay content.

14. The method of claim 1, further comprising:

determining that the detected event has ended; and streaming default multimedia content to the second display device of the user.

15. A non-transitory computer-readable storage medium for providing personalized avatars for virtual companionship, configured with instructions executable by one or more processors to cause the one or more processors to perform operations comprising:

providing educational content of an online education platform for display on a first display device of a user;

capturing one or more current online activities of the user including interactions with the educational content displayed on the first display device by the user;

receiving sensor data from one or more electronic devices of the user;

detecting an event by analyzing the one or more captured online activities of the user and the received sensor data;

selecting, automatically without user input, an avatar role from a plurality of avatar roles and a virtual background from a plurality of virtual backgrounds based on the detected event, wherein each of the virtual backgrounds represents a virtual space in which avatars can be placed;

determining one or more avatars of the selected avatar role and one or more special effects associated with the one or more avatars based on the detected event and one or more predetermined rules mapping avatars and special effects to events;

generating multimedia content by projecting the one or more avatars and the one or more special effects on the virtual background; and streaming the generated multimedia content to a second display device of the user, the streamed multimedia content being synchronized with the one or more online activities of the user that include interactions with the educational content displayed on the first display device, wherein the streamed multimedia content is synchronized with the one or more online activities of the user by:

determining the one or more special effects associated with the one or more avatars to include the one or more avatars interacting with virtual content identical to the displayed educational content in a manner identical to that of the interactions by the user, and generating the multimedia content to show that the one or more avatars interact with the virtual content at a set pace, wherein the set pace is determined based on a pace at which the user interacts with the educational content displayed on the first display device.

16. The medium of claim 15, wherein the determining one or more avatars comprises:

determining, based on the detected event, a quantity of avatars to present, wherein the determined one or more avatars consist of one or more avatars of the determined quantity.

17. The medium of claim 15, wherein the determining one or more avatars of the selected avatar role and one or more special effects comprises:

selecting the one or more avatars from a library comprising a plurality of avatars; and selecting the one or more special effects from a library comprising a plurality of pre-rendered special effects each corresponding to at least one of the plurality of avatars.

18. The medium of claim 17, wherein the operations further comprise, prior to capturing one or more current online activities of the user, for one of the plurality of avatars:

rendering a two-dimensional or three-dimensional representation of the avatar;

pre-rendering one or more special effects associated with the avatar by animating the representation of the avatar to follow one or more actions; and storing the one or more special effects in the library comprising the plurality of pre-rendered special effects.

19. The medium of claim 15, wherein the operations further comprise:
   determining that the detected event has ended; and
   streaming default multimedia content to the second display device of the user.

20. A system for providing personalized avatars for virtual companionship, comprising a processor and a non-transitory computer-readable storage medium storing instructions executable by the processor to cause the system to:
   provide educational content of an online education platform for display on a first display device of a user;
   capture one or more current online activities of the user including interactions with the educational content displayed on the first display device by the user;
   receive sensor data from one or more electronic devices of the user;
   detect an event by analyzing the one or more captured online activities of the user and the received sensor data;
   select, automatically without user input, an avatar role from a plurality of avatar roles and a virtual background from a plurality of virtual backgrounds based on the detected event, wherein each of the virtual backgrounds represents a virtual space in which avatars can be placed;
   determine one or more avatars of the selected avatar role and one or more special effects associated with the one or more avatars based on the detected event and one or more predetermined rules mapping avatars and special effects to events;
   generate multimedia content by projecting the one or more avatars and the one or more special effects on the virtual background; and
   stream the generated multimedia content to a second display device of the user, the streamed multimedia content being synchronized with the one or more online activities of the user that include interactions with the educational content displayed on the first display device, wherein the streamed multimedia content is synchronized with the one or more online activities of the user by:
      determining the one or more special effects associated with the one or more avatars to include the one or more avatars interacting with virtual content identical to the displayed educational content in a manner identical to that of the interactions by the user, and
      generating the multimedia content to show that the one or more avatars interact with the virtual content at a set pace, wherein the set pace is determined based on a pace at which the user interacts with the educational content displayed on the first display device.

* * * * *